United States Patent [19]
von Lauff et al.

[11] 4,063,957
[45] Dec. 20, 1977

[54] MANUFACTURE OF EASILY DISPERSED TRANSPARENT IRON OXIDE PIGMENTS

[75] Inventors: Hans Peter von Lauff, Velbert; Wolfgang Fabian, Wilhelmsfeld; Heidrun Hellstern, Cologne, all of Germany

[73] Assignee: BASF Aktiengesellschaft, Ludwigshafen (Rhine), Germany

[21] Appl. No.: 758,207

[22] Filed: Jan. 10, 1977

[30] Foreign Application Priority Data

Jan. 28, 1976    Germany ............................. 2603050

[51] Int. Cl.² ............................................. C09C 1/24
[52] U.S. Cl. .................. 106/304; 106/308 Q; 106/309
[58] Field of Search .................... 106/304, 308 Q, 309

[56] References Cited

U.S. PATENT DOCUMENTS

| | | | |
|---|---|---|---|
| 3,536,511 | 10/1970 | Greiner | 106/309 |
| 3,577,254 | 5/1971 | Petke | 106/309 |
| 3,577,255 | 5/1971 | Petke | 106/309 |

FOREIGN PATENT DOCUMENTS

| | | | |
|---|---|---|---|
| 1,348,988 | 3/1974 | United Kingdom | 106/304 |

Primary Examiner—Winston A. Douglas
Assistant Examiner—J. V. Howard
Attorney, Agent, or Firm—Keil, Thompson & Shurtleff

[57] ABSTRACT

A process for the manufacture of easily dispersed, transparent iron oxide pigments of high tinctorial strength, in which the pigment paste, moist with water, is homogenized under the action of shear forces in the presence of at least one monohydric aliphatic or cycloaliphatic alcohol of 4 to 12 carbon atoms which is partially soluble in water and can be vaporized without decomposition, and the kneaded mixture is then dried under gentle conditions. The pigments are easily dispersed in finishes or binder solutions for printing inks. Very pure and glossy colorations of optimum transparency are obtained.

11 Claims, No Drawings

MANUFACTURE OF EASILY DISPERSED TRANSPARENT IRON OXIDE PIGMENTS

The present invention relates to a process for the manufacture of easily dispersed, transparent iron oxides.

The manufacture of transparent iron oxides is disclosed, e.g., in BIOS Report 1,144, pages 29–33 and FIAT Report 814, pages 1–26. Further literature is cited in the "Pigment Handbook", published by T. C. Patton, John Wiley & Sons Inc., New York 1973, pages 337–340 and 343, and in H. Kittel "Pigmente", Wissenschaftliche Verlagsgesellschaft MBH, Stuttgart, 1960, pages 321–331. As a rule, such products are manufactured by mixing aqueous solutions of iron salts, commonly iron-II sulfate, in the presence of oxidizing agents, e.g. air, and seeding crystals, with alkalis, so as to maintain a definite pH range, the pigments precipitating as hydrated iron oxides. These are separated off, washed with water until free from salt and neutral, dried and finely milled. Depending on the precipitation conditins, e.g. the pH and/or temperature, yellow to orange-red iron oxides are obtained.

The various hues are primarily attributable to different forms of the primary particles formed during precipitation. Such tinctorially and technologically important properties of the iron oxides are discussed in the "Pigment Handbook" (l.c.), pages 333–347.

Iron oxide pigments which consists of primary particles having an acicular narrow habit, the length being about 0.2μm and the width about 0.01μm, are tinctorially particularly valuable. When dispersed in paints and printing inks, such pigments are distinguished by high transparency when used in full strength. However, they suffer from a servere disadvantage in that they are very hard-grained, i.e. they can only be dispersed with great difficulty in the media to be employed. For this reason, long dispersion times, of up to 200 hours, are required to produce transparent printing inks and paints, even when high-intensity milling equipment is used, in order to break down the agglomerated iron oxide primary particles to give transparent glossy hues when the pigment is used in full strength.

This poor dispersibility or grain hardness, which has hitherto been characteristic of transparent iron oxide pigments which give a pure hue, can be influenced to only a very slight degree, if at all, by measures taken during synthesis of the pigments. German Pat. No. 1,592,489 discloses a process for the manufacture of a yellow, transparent iron oxide pigment which is dried at 110° C. Russian Pat. No. 342,875 discloses a process for the manufacture of yellow, red and brown iron oxide pigments, in which the pigment is dried at from 80° to 120° C. The iron oxide pigments obtained by these processes are also hard-grained.

British Pat. No. 1,348,988 discloses a process for the manufacture of easily dispersed iron oxide pigments. According to this patent, the iron oxide paste obtained from the process of manufacture, and washed until neutral and free from salt, is mixed with at least a twofold amount, based on water present in the iron oxide paste, of butanols, preferably isobutanol, and the mixture is heated at 60°–100° C. To obtain iron oxide pigments having optimum properties, it is necessary to use an amount by weight of butanol which is from 4 to 20 times that of the iron oxide pigment present in the iron oxide pigment paste, and to stir the mixture for a considerable time. The pigment is then filtered off and dried at 80° C.

It is true that the yellow iron oxide pigments obtained by this process exhibit improved dispersibility compared to pigments which have been manufactured under otherwise identical conditions but have not been treated with butanol, but these pigments do not conform to high standards of transparency. Thus, printing inks manufactured with such iron oxide pigments exhibit a grey, dull haze.

The process further suffers from the disadvantage that because of the high dilution, and the resulting low space-time yield, and because of the additional operations involved, substantial additional costs are entailed.

Further, it has been disclosed that pigments obtained in a moist form, e.g. as a press cake, from the process of manufacture, generally give soft-grained products when dried under gentle conditions. This is true, in particular, of spray-drying and freeze-drying, amongst which freeze-drying again gives the pigments which are most easily dispersed and exhibit the highest quality (U.S. Pat. No. 3,159,498).

If the yellow iron oxide pigment obtained in the form of an aqueous, neutral and salt-free paste is isolated by freeze-drying, this product is significantly more easily dispersed than the pigment obtained from the same paste by drying at 80° C. However, the printing inks or paints obtained after a short period of grinding with the binder give dull and pale prints or colorations. The printing inks contain specks and as a result thin print films, e.g. of less than 50μm, give matt, rough and dull surfaces. Furthermore, the colorations and prints obtainable with such paints or printing inks do not have the transparency demanded in practice.

It is an object of the present invention to provide a process which gives transparent yellow iron oxide pigments which have high tinctorial strength, are easily dispersed and give speck-free printing inks and paints.

We have found that this object is achieved and that easily dispersed, transparent iron oxide pigments of high tinctorial strength can be manufactured from iron oxide pigment pastes moist with water by a process wherein the said paste is homogenized in the presence of from 0.1 to 20 percent by weight, based on dry iron oxide, of a monohydric aliphatic or cycloaliphatic alcohol of 4 to 12 carbon atoms, which is only partially soluble in water and can be vaporized without decomposition, or of mixtures of such alcohols, under the action of shear forces, and the mixture is dried under gentle conditions.

The process of the invention gives yellow iron oxide pigments which are easily dispersed and give deep, glossy and transparent colorations and prints of a pure hue.

To manufacture the easily dispersed iron oxide pigments, the procedure generally followed is to homogenize the neutral watery iron oxide paste, which has a low salt content and as a rule contains from 40 to 60 percent by weight of iron oxides, in the presence of from 0.1 to 20, preferably from 5 to 15, percent by weight, based on iron oxide, of a monohydric, partially water-soluble, aliphatic or cycloaliphatic alcohol of 4 to 12 carbon atoms, which can be vaporized without decomposition, or of mixtures of such alcohols, under the action of shear forces. The pigment is then isolated in the solid form from the resulting homogeneous pasty mass either in the usual manner by drying at from 80° to 100° C in a drying oven, by spray-drying or, preferably, by freeze-drying.

Yellow iron oxides which are obtained in the form of aqueous pastes by conventional processes of the prior art may be used as starting materials for the process of the invention. The aqueous pastes must be neutral and contain little salt, if any, this condition being achievable by conventional washing with water. In general, such pastes contain from 40 to 60 per cent by weight of iron oxides.

Examples of suitable monohydric, partially water-soluble aliphatic and cycloaliphatic alcohols of 4 to 12, preferably of 5 to 12 carbon atoms, which may be vaporized without decomposition, are n-butanol, isobutanol, sec.-butanol and, preferably, 1-pentanol, isopentanol, 2-methylpentanol, 2,2-dimethylpropanol, 1-hexanol, isohexanol, 1-heptanol, isoheptanol, 2,4-dimethyl-3-pentanol, 1-octanol, isooctanol, 2-ethyl-1-hexanol, nonanol, isononanol, 1-decanol, isodecanol, 2,2,5,5-tetramethyl-3-hexanol, 1-dodecanol, 6-isododecanol, cyclohexanol, 1-methyl-1-cyclohexanol, 1-ethyl-1-cyclohexanol or mixtures thereof.

Where it is desired to isolate the pigment from the kneaded mass by freeze-drying, the alcohols used are of 5 to 12 carbon atoms and have a melting point of from $-20°$ to $+60°$ C. In this case, examples of suitable alcohols are 2,2-dimethyl-1-dimethyl-1-propanol (neopentyl alcohol), 2,4-dimethyl-3-pentanol, 2,2,5,5-tetramethyl-3-hexanol, 1-decanol, 1-dodecanol, 6-dodecanol, cyclohexanol, 1-ethylcyclohexanol and 1-methylcyclohexanol. For technical and economic reasons, n-octanol, 2,2-dimethyl-1-propanol, 1-dodecanol and cyclohexanol are preferred, and amongst these n-octanol and cyclohexanol are very particularly preferred, since they give tinctorially particularly valuable iron oxide pigments.

The amount of alcohols used is from 0.1 to 20 per cent by weight, based on iron oxide. The use of from 5 to 15 per cent by weight, based on iron oxide, is preferred.

The temperature at which the paste is subjected to shear forces, i.e. at which dispersion is carried out, has little or virtually no influence on the tinctorial properties. As a rule, therefore, the process is carried out in the autogenous temperature range of the mixture under the action of the shear forces, i.e. from room temperature to 95° C and preferably from 35° to 65° C.

Dispersion is continued until a homogeneous, pasty and glossy mass has formed from the aqueous paste and the added alcohol. Such is generally the case after from 10 to 60 minutes, in most cases from 15 to 30 minutes.

The dispersion under the action of shear forces is effected in mixers, advantageously in kneaders, and may be carried out batchwise or continuously.

The mass obtained from dispersion in the presence of the stated alcohols can be dried in the conventional manner in drying ovens at from 80° to 100° C.

The yellow iron oxide pigments obtained, after having been finely milled in the conventional manner, require only a short period of dispersion, e.g. half an hour in a ®Red Devil, to produce finishes which give deep, transparent colorations of a pure hue. These iron oxide pigments are also superior to the iron oxide pigments isolated from the same aqueous iron oxide paste, without addition of the stated alcohols, by freeze-drying.

Tinctorially particularly valuable pigments are obtained by isolating the pigment from the kneaded mass by freeze-drying. Freeze-drying gives the yellow iron oxide pigments as extremely loose agglomerates which on touching or vibration immediately disintegrate to a powder. Hence these pigments no longer require milling before further processing.

The iron oxide pigments obtained by the process of the invention and isolated by freeze-drying require, for dispersion, only a fraction of the time hitherto required for similar pigments of the prior art.

Thus, for example, a baking finish exhibits 97% of the achievable final tinctorial strength after only 3 passes on a triple-roll mill under 15 bars pressure.

Under the same conditions, a pigment obtained from the same kneaded mass by drying at 80° C and milling gives 64% of the achievable final tinctorial strength. In contrast, a pigment obtained from the same aqueous iron oxide paste by drying at 80° C and milling gives only 42% of the final tinctorial strength.

For the above reasons, the iron oxide pigments of the invention are preferably isolated by freeze-drying.

The pigments obtained according to the invention offer special advantages for the manufacture of printing inks; with little dispersion, deep printing inks, which give very pure and glossy prints of optimum transparency, are obtained, especially in the case of the iron oxide pigment isolated by freeze-drying. Thus, very pure, delicate, glossy golden hues can be produced on an aluminum foil by means of a printing ink obtained as above.

By contrast, iron oxide pigments of the prior art, subjected to dispersion for the same period, do not produce transparent printing inks, for which reason dispersion times or more than 20 and up to 200 hours are required in order to obtain a transparent printing ink.

A further preferred use of the transparent yellow iron oxide pigments obtained by the process of the invention is the manufacture of red iron oxide pigments by the calcining process. In this process, yellow iron oxide pigments are heated at from 160° to 400° C, whereupon the hue is shifted to red, water being eliminated.

Thus, for example, on heating the yellow iron oxide pigments manufactured by the process of the invention for 3 hours at 380° C, red, easily dispersed iron oxide pigments are obtained, which after incorporation into binders give red colorations having a very pure hue and excellent transparency.

By contrast, heating yellow iron oxide pigments of the prior art gives relatively dull and matt red iron oxide pigments.

The tinctorial properties of the yellow iron oxide pigments obtained by the process of the invention were both unforeseeable and unexpected, since the iron oxide pigments obtained according to the process described in British Pat. No. 1,348,988 do not exhibit adequate transparency and tinctorial strength. Furthermore, these pigments are duller and printing inks produced therewith give prints containing specks. In addition, the pigments obtained according to the invention are much easier to disperse.

The Examples which follow illustrate the invention. Percentages referred to below are by weight.

EXAMPLE 1

50 g of a transparent yellow iron oxide pigment of low salt content, in the form of a press cake of 50% solids content, and 2.5 g of cyclohexanol are kneaded in a kneader of 80 cc. capacity for 15 minutes at 30° C, giving a homogeneous, pasty mass. This mass is dried in a drying oven at 80° C. A soft-grained, transparent yellow iron oxide pigment is obtained, which is pulverized before being processed further.

If instead of cyclohexanol the same amount of n-octanol is used, an iron oxide pigment having virtually the same properties is obtained.

EXAMPLE 2

The procedure described in Example 1 is followed, but the kneaded pigment mass is freeze-dried at $-5°$ C. The solvent is then sublimed off the frozen mass in a vacuum drying oven at a pressure of from 0.1 to 1 mm Hg. A transparent yellow iron oxide pigment is obtained in the form of a particularly loose, soft-grained powder. The product does not require milling before further processing.

EXAMPLE 3

50 g of a transparent yellow iron oxide pigment of low salt content, in the form of a press cake of 50% solids content, and 2.5 g of neopentyl alcohol are kneaded in a kneader of 80 cc. capacity for 15 minutes at 55° C, giving a homogeneous, glossy, pasty mass. The mass is dried at 80° C under atmospheric pressure. A yellow iron oxide pigment which exhibits the same properties as the pigment described in Example 1 is obtained. If the pigment is isolated from the kneaded mass by freeze-drying, an iron oxide pigment having the same properties as the pigment described in Example 2 is obtained.

A pigment with almost equivalent properties is obtained if the neopentyl alcohol is replaced by the same amount of 2,4-dimethyl-3-pentanol, 2,2,5,5-tetramethyl-3-cyclohexanol, 1-decanol, 1-ethylcyclohexanol or 1-methylcyclohexanol.

EXAMPLE 4

The procedure described in Example 1 is followed, but instead of cyclohexanol the same amount of 1-dodecanol is used. A yellow iron oxide pigment having virtually the same properties as the pigment described in Example 1 is obtained.

The same result is achieved by replacing 1-dodecanol by its isomer 6-dodecanol.

EXAMPLE 5

The procedure described in Example 2 is followed, but instead of cyclohexanol the same amount of 6-dodecanol is used. The iron oxide pigment has the same tinctorial properties as the pigment obtained as described in Example 2.

A pigment with virtually the same properties is obtained if the 6-dodecanol is replaced by its isomer 1-dodecanol.

EXAMPLE 6

25 g of the yellow iron oxide pigment produced as described in Example 1 are heated for one hour at 380° C in a muffle furnace. A soft-grained red iron oxide pigment of high transparency is obtained as a loose powder which no longer requires grinding before being processed further.

Tinctorially similar red iron oxide pigments are obtained by using the yellow iron oxide pigments of Example 2, 3 or 4.

EXAMPLE 7 a. 47.5 g of a nitro-combination finish (45% solids content), 2.5 g of the yellow iron oxide pigment produced as described in Example 1 and 50 g of glass beads (2 mm diameter) are placed in a 100 cc. glass container with a screw cap, and are shaken on a disperser (®Red Devil) for one hour. A finely dispersed finish (printing ink) is obtained, which when spread as a 60µ thick layer on paper-backed aluminum, gives a very transparent, speck-free golden coloration.

b. If the pigment used is the yellow iron oxide pigment isolated by freeze-drying as described in Example 2, a speck-free golden coloration is again obtained, which is even more transparent and glossier than the coloration obtained as described in (a).

c. If an iron oxide pigment obtained by freeze-drying of the watery yellow iron oxide press cake, used as the starting material for Examples 1 and 2, is employed, pale, dull prints containing specks are obtained.

EXAMPLE 8

47.5 g of a nitro-combination finish (45% solids content) are weighed into a 100 cc. glass container with a screw cap, and 2.5 g of the transparent red iron oxide pigment manufactured as described in Example 6 and 50 g of glass beads (2 mm diameter) are added. This mixture is shaken for one hour on a disperser (®Red Devil). A finely dispersed finish (printing ink) is obtained, which in a 30µ thick layer gives a very transparent red hue on paper-backed aluminum.

EXAMPLE 9 a. 213.75 g of an acrylic baking finish (50% solids content), 36.25 g of xylene and 250 g of an iron oxide pigment obtained as described in Example 1 are introduced into a water-cooled steel vessel (1.5 liters capacity, 10.5 mm diameter). This mixture is stirred at 200 rpm for 2 hours by means of a dissolver having a stirring disc of 5 cm diameter. 200 g of the concentrate thus produced are diluted with 300 g of acrylic baking finish (25% solids content) and the mixture is dispersed for 15 minutes in a bead mill (1.5 liters capacity; grinding bodies 500 g of glass beads of 2 mm diameter and 500 g of glass beads of 3 mm diameter. A finely dispersed speck-free colored acrylic resin baking finish is obtained. After dilution to 5% pigment content with the base finish, a 60µm thick coating of the product on paper-backed aluminum gives a highly transparent golden hue.

b. An even more transparent and even glossier coloration is obtained by using the yellow iron oxide pigment described in Example 2.

c. If the same finish is produced using an iron oxide pigment which has not been homogenized in the presence of alcohols and instead has been isolated from the aqueous phase by freeze-drying and has been milled, a more opaque, dull coloration and a matt and rough surface are obtained.

EXAMPLE 10

The procedure described in Example 9 (a) is followed but instead of the transparent yellow iron oxide pigment the transparent red iron oxide pigment obtained as described in Example 6 is used. The mixture of concentrate and acrylic baking finish is dispersed for 30 minutes. After dilution to 5% pigment content with the base finish, a finely dispersed colored acrylic baking finish is obtained, which, as a 30µm thick coating on paper-backed aluminum gives a highly transparent red hue.

Similar colorations are obtained by using red iron oxide pigments which have been produced from the yellow pigments of Example 2, 3 or 4.

We claim:

1. A process for the manufacture of easily dispersed, transparent iron oxide pigments of high tinctorial strength from iron oxide pigment pastes moist with water, which comprises homogenizing said paste in the presence of from 0.1 to 20 percent by weight, based on dry iron oxide, of a monohydric aliphatic or cycloaliphatic alcohol of 4 to 12 carbon atoms, which is only partially soluble in water and can be vaporized without decomposition, or of mixtures of such alcohols, under the action of shear forces, and drying the mixture under gentle conditions.

2. A process as claimed in claim 1, wherein from 5 to 15 percent by weight, based on iron oxide, of the aliphatic or cycloaliphatic alcohols are used.

3. A process as claimed in claim 1, wherein aliphatic or cycloaliphatic alcohols of 5 to 12 carbon atoms are used.

4. A process as claimed in claim 1, wherein n-butanol, isobutanol, sec.-butanol, 1-pentanol, isopentanol, 2-methylpentanol, 2,2-dimethylpropanol, 1-hexanol, isohexanol, 1-heptanol, isoheptanol, 2,4-dimethyl-3-pentanol, 1-octanol, isooctanol, 2-ethyl-1-hexanol, nonanol, isononanol, 1-decanol, isodecanol, 2,2,5,5-tetramethyl-3-hexanol, 1-dodecanol, 6-dodecanol, isododecanol, cyclohexanol, 1-methyl-1-cyclohexanol, 1-ethyl-1-cyclohexanol or mixtures thereof are used as monohydric, partially water-soluble alcohols.

5. A process as claimed in claim 3, wherein 1-pentanol, isopentanol, 2-methylpentanol, 2,2-dimethylpropanol, 1-hexanol, isohexanol, 1-heptanol, isoheptanol, 2,4-dimethyl-3-pentanol, 1-octanol, isooctanol, 2-ethyl-1-hexanol, nonanol, isononanol, 1-decanol, isodecanol, 2,2,5,5-tetramethyl-3-hexanol, 1-dodecanol, 6-dodecanol, isododecanol, cyclohexanol, 1-methyl-1-cyclohexanol, 1-ethyl-1-cyclohexanol or mixtures thereof are used as monohydric, partially water-soluble alcohols.

6. A process as claimed in claim 1, wherein the homogenized mixture is isolated by freeze-drying.

7. A process as claimed in claim 6, wherein 2,2-dimethyl-1-propanol (neopentyl alcohol), 2,4-dimethyl-3-pentanol, 2,2,5,5-tetramethyl-3-hexanol, 1-decanol, 1-dodecanol, 6-dodecanol, cyclohexanol, 1-ethylcyclohexanol and 1-methylcyclohexanol are used as monohydric, partially water-soluble alcohols.

8. A process as claimed in claim 1, wherein n-octanol, 2,2-dimethyl-1-propanol, 1-dodecanol or cyclohexanol are used as monohydric, partially water-soluble alcohols.

9. A process as claimed in claim 1, wherein the mixture is exposed to the action of the shear forces at from room temperature to 95° C.

10. A process as claimed in claim 3, wherein the mixture is exposed to the action of the shear forces at from 35° to 65° C.

11. A process for the manufacture of red iron oxide pigments, wherein the iron oxides obtained according to the process as claimed in claim 1 are heated at from 160° to 400° C.

* * * * *